United States Patent [19]

Alferness et al.

[11] Patent Number: 5,602,998
[45] Date of Patent: Feb. 11, 1997

[54] DEQUEUE INSTRUCTION IN A SYSTEM ARCHITECTURE FOR IMPROVED MESSAGE PASSING AND PROCESS SYNCHRONIZATION

[75] Inventors: Merwin H. Alferness, New Brighton; Charles R. Caldarale, Minneapolis; David C. Johnson, Roseville; David R. Johnson, Oakdale; James R. McBreen, Shoreview; Wayne D. Ward, New Brighton, all of Minn.

[73] Assignee: Unisys Corporation, Blue Bell, Pa.

[21] Appl. No.: 362,638

[22] Filed: Dec. 22, 1994

[51] Int. Cl.$^6$ .................................................. G06F 9/46
[52] U.S. Cl. .................................................. 395/566; 395/876
[58] Field of Search ...................... 364/DIG. 1, DIG. 2; 395/375, 700, 880

[56] References Cited

U.S. PATENT DOCUMENTS

| | | | |
|---|---|---|---|
| 4,394,725 | 7/1983 | Bienvenu et al. | 364/200 |
| 4,649,473 | 3/1987 | Hammer et al. | 364/200 |
| 4,694,396 | 9/1987 | Weisshaar et al. | 364/300 |
| 4,807,111 | 2/1989 | Cohen et al. | 364/200 |
| 4,937,737 | 6/1990 | Schwane et al. | 364/200 |
| 5,073,852 | 12/1991 | Siegel et al. | 395/700 |
| 5,218,713 | 6/1993 | Hammer et al. | 395/800 |
| 5,222,217 | 6/1993 | Blount et al. | 395/325 |
| 5,224,215 | 6/1993 | Disbrow | 395/250 |
| 5,230,051 | 7/1993 | Quan | 395/700 |
| 5,313,638 | 5/1994 | Ogle et al. | 395/725 |
| 5,319,778 | 6/1994 | Catino | 395/600 |

OTHER PUBLICATIONS

Gregory T. Byrd and Bruce A. Delagi, "Support for Fine–Grained Message Passing in Shared Memory Multi-processors" Mar. 1989, Knowledge Systems Laboratory, Report No. KSL–89–15, pp. 1–20.

F. J. Burkowski, G. V. Cormack, G. D. P. Dueck, "Architectural Support for Synchronous Task Communication" SIGARCH Computer Architecture News, vol. 17, No. 2, Apr. 1989, pp. 40–53.

Brian N. Bershad, Thomase E. Anderson, "User–Level Interprocess Communication for Shared Memory Multiprocessors" ACM Transactions on Computer Systems, vol. 9, No. 2, May 1991, pp. 175–198.

Joseph Pasquale, Eric Anderson, P. Keith Muller, "Container Shipping Operating System Support for I/O Intensive Applications" IEEE Computer Mar. 1994, pp. 84–93.

Gary J. Nutt, "Centralized and Distributed Operating Systems" Prentice–Hall, Inc., 1992, pp. 31–37, 109–117.

*Primary Examiner*—Robert B. Harrell
*Attorney, Agent, or Firm*—Charles A. Johnson; Mark T. Starr

[57] ABSTRACT

A system and method for removing a queue entry containing message data from a queue shared by communicating, sequential processes includes dequeue (DEQ) and dequeue or wait (DEQW) instructions. The dequeue instruction removes a queue entry from the head of the shared queue, thereby providing access to the message data contained in the queue entry to the dequeuing process. The dequeue or wait instruction removes a queue entry from the shared queue if there is one, otherwise it suspends the execution of the dequeuing process until an entry is enqueued to the queue. If an event is selected by the dequeuing process, the dequeuing process is suspended until notification of the event is detected in the shared queue. Execution of the dequeue and dequeue or wait instructions include blocking access to the queue by other processes, updating queue linkages, deactivating processes waiting on entries or events being made to the queue, monitoring interrupts, and validating the appropriate queue data structures.

8 Claims, 11 Drawing Sheets

DEQ a,*d,*x,b

DEQUEUE INSTRUCTION IN A SYSTEM ARCHITECTURE FOR IMPROVED MESSAGE PASSING AND PROCESS SYNCHRONIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

RELATED APPLICATIONS

This application relates to the concurrently filed application of Merwin H. Alferness, et. al., Docket Number RA-3317, entitled "System Architecture for Improved Message Passing and Process Synchronization Between Concurrently Executing Processes," the disclosure of which is hereby incorporated by reference.

BACKGROUND OF THE INVENTION

1. Field of the Invention

This invention relates generally to multiprocessing digital computer systems and particularly to instruction set architecture support for passing messages between concurrently executing processes and for synchronizing concurrently executing processes.

2. Background Information

The application of Merwin H. Alferness, et. al., Docket Number RA-3317, discloses a system architecture for providing improved message passing and process synchronization capabilities. Critical enhancements are made to operating system functions to permit processes executing within this system architecture to pass large messages between them without incurring large performance penalties associated with multiple copy operations on the message data. High level language support is provided in this system to enable an applications programmer to easily use the added functionality of the system. Hardware instruction set architecture support is also provided by the system to ensure that transfers of data and synchronization of communicating processes take place at machine speeds, rather than through multiple software layers of process control in the operating system.

The system architecture, known as the "Queuing Architecture," uses queues as a mechanism for message passing and process synchronization. A queue client process places entries or events on a queue. A queue server process receives entries or events from a queue. An entry contains a message passed between a client process and a server process over the queue. The message consists of data or control information. An event is an indication that a condition known to both the client process and server process has occurred, but which contains no message. Thus, an event works as a synchronization mechanism between processes. Each entry on a queue is represented in a unit of storage called a queue bank. The queue bank has a control area and a text area. The control area contains control information and pointers to other entries on a queue. The text area contains the message data. In the preferred embodiment of the present invention, the text area of a queue bank is limited in size to 262,144 36-bit words. A queue bank may be a queue header or a queue entry. A queue is made up of one queue header and zero or more queue entries. The queue header holds control information for the queue. Queue entries hold the message data being passed between processes. To pass a message from one process to another process in the Queuing Architecture, the sending process inserts the message data into a queue entry and then enqueues it to a queue. The receiving process, which may be waiting on entries being placed on the queue, dequeues the queue entry and princesses the message data.

The implementation of the dequeue operation is of critical importance tier this system architecture. If the act of removing a queue entry from a queue is too slow, overall performance of the system suffers because of the frequency of use of the dequeue operation. Furthermore, the dequeue operation should be performed without copying the message data contained in the queue entry in order to maximize system throughput. Existing message passing systems usually copy the message data from the sending process's virtual space into the system memory used to represent a mailbox. The data is then copied from the mailbox into the receiving process's virtual space. Ideally, the processing time required to perform this copying of the message data should be eliminated. It would be more efficient if a mechanism was provided in the architecture of the system such that the message data could be transferred between processes via a shared queue structure without the need for copying. If the dequeue operation could be performed by the hardware of the system, rather than by the operating system kernel, system performance could be greatly improved.

SUMMARY OF THE INVENTION

An object of this invention is to efficiently remove message data to be transferred from a sending process to a receiving process from a shared queue without copying the message data.

Another object of this invention is to dequeue a queue entry from a queue shared by multiple communicating processes in one instruction.

Still another object of this invention is to provide an application programmer with instruction set architecture support for improved message passing and process synchronization capabilities.

Yet another object of this invention is to provide a specialized instruction, which is part of the instruction set architecture of a computer system, to dequeue message data or an event indicator from a queue structure shared by multiple communicating processes.

A further object of this invention is to provide a dequeue instruction for dequeuing a queue entry containing message data to be passed between communicating processes from a shared queue in a minimum amount of system processing time.

Another object of this invention is to provide a dequeue instruction for dequeuing a queue entry containing message data from a shared queue whereby the process requesting the dequeue operation is suspended if at the time of the request there are no entries or events in the queue. The suspended process is then activated at a later point in time when an entry is enqueued to the queue.

Another object of this invention is to provide a new instruction to efficiently detect an event indicator passed from one process to another process.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a new instruction which removes a queue entry containing message data transferred from a sending process to a receiving process from a queue shared by the processes, thereby providing the receiving process access to the message data. If desired, in lieu of removing a queue entry containing message data, the new instruction detects an event indicator in the shared queue structure, thereby providing synchronization capabilities between the two communicating processes.

In accordance with an aspect of this invention, a computer system executing multiple princesses controlled by a computer operating system has at least one processor for executing instructions and a main storage unit accessible by the processes for storing units of data storage called queue banks. Each queue bank is capable of representing a queue header or queue entry of a queue, and each queue is a linked list of one queue header and zero or more queue entries. A queue entry stores a group of data signals to be communicated from a sending process to a receiving process. A queue header stores queue control information including queue links and an event indicator. The system supports interprocess communication by executing a dequeue instruction. The system includes means for accessing a queue selected by the operands of the dequeue instruction, means for accessing a queue entry to be dequeued from the selected queue, and means for updating the queue links of the queue to remove the queue entry at the front of the selected queue, thereby providing access to the data signals stored in the queue entry to the receiving process.

In accordance with another aspect of the invention, a method of executing a single instruction by a processor to receive message data words from a sending process includes the steps of calculating the address of the queue header of a queue selected by the operands of the instruction in order to access the queue, and updating the links in the queue to remove the queue entry from the front of the selected queue, thereby providing access to the message data words stored in the queue entry to the receiving process.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DESCRIPTION OF THE PREFERRED EMBODIMENT

The Dequeue (DEQ) instruction is used to dequeue an entry, if any, from a queue that is used for passing messages between processes. The Dequeue Or Wait (DEQW) instruction dequeues an entry or event from the queue, if the queue is not empty, but if the queue is empty, then the process executing the DEQW instruction is suspended until an entry or event is placed on the queue. The DEQ and DEQW instructions provide instruction set architecture support for implementing the Queuing Architecture in an efficient manner. Co-pending, related application Docket Number RA-3317 fully describes the Queuing Architecture system in which the present invention is embodied, the disclosure of which is hereby incorporated by reference.

Figure 1:
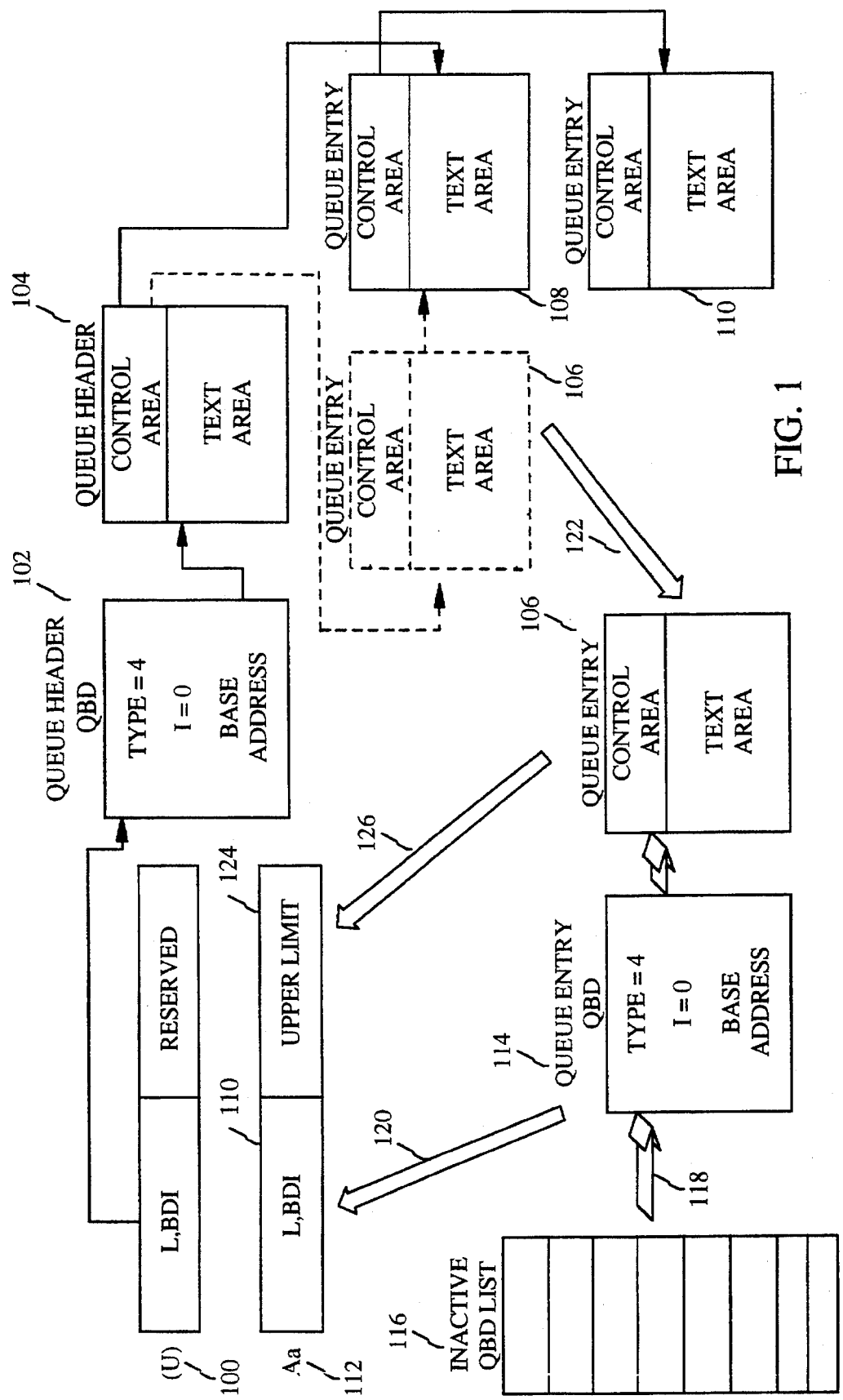
FIG. 1 is a block diagram illustrating the functionality of the Dequeue instruction.

FIG. 1 is a block diagram illustrating the functionality of the Dequeue instruction. A Queue Bank Descriptor (QBD) is the basic storage structure used for managing the system addressing environment. A QBD is identified by a Level, Bank Descriptor Index (L,BDI) value. In the preferred embodiment, all addresses in storage can be identified by virtual addresses. A virtual address is a 36-bit word identifying the name of the bank in which the address lies and the position of the address within the bank. The Level (L) selects one of eight Bank Descriptor Tables (BDTs) (not shown) and the Bank Descriptor Index (BDI) selects one of up to 32,768 Bank Descriptors in the selected BDT. QBDs are used to access Queue Banks, which are the fundamental storage elements making up a Queue in the system. The L,BDI value of a Queue Header of a Queue is specified by the contents of the Instruction Operand Address "(U)" 100. The value of (U) is formed by adding the unsigned value of the displacement field of the instruction (not shown in FIG. 1) to the signed modifier portion of an Index register (not shown) specified by the "x" field of the instruction (not shown). For DEQ and DEQW instructions, the contents of the memory location specified by Bits 0–17 of (U) point to the Queue Header QBD 102. Bits 18–35 of (U) are reserved. The Base Address field in the Queue Header QBD 102 points to the Queue Header 104.

In the example shown in FIG. 1, this Queue has three Queue Entries (before the dequeue operation is performed). The Queue Entry dequeued by this instruction is shown by a dashed line object before the dequeue takes place. The Queue Header 104 has been previously created by a CREATESQH EXEC operating system service call (as disclosed on pp. 24–29 of related application Docket Number RA-3317) and the Queue Entries 106, 108, 110 have been enqueued via earlier calls to an Enqueue (ENQ) instruction. The ENQ instruction is shown on pp. 42–43 of related application Docket Number RA-3317.

The other main operand of the DEQ and DEQW instructions is the Arithmetic Register "Aa" operand 112. In the preferred embodiment, the Arithmetic Registers are capable of providing input for or accepting results from arithmetic operations. The "a" field in the DEQ/DEQW instruction (not shown in FIG. 1) specifies which Arithmetic Register is to be used to accept results from execution of this instruction. If the Queue's initial Count (that is, the number of entries on the Queue) is non-zero, then the Queue Entry 106 at the head of the Queue is to be dequeued. An Inactive QBD 114 is acquired by removing one from the Inactive QBD List 116. This is represented as action Arrow 118 in FIG. 1. The Queue Entry QBD's L, BDI value is written into Bits 0–17 of Aa 112. This is represented by action Arrow 120. The newly acquired Inactive QBD becomes the Queue Entry QBD 114 and the entry's Queue Bank (Queue Entry 106) is mapped to the Queue Entry QBD 114, and the Queue Entry 106 is removed from the Queue. This is represented as action Arrow 122. The appropriate pointers in the Control Area of the Queue Header 104 are updated to reflect the change in the Queue structure. Complete definitions of the Queue Header and Queue Bank Descriptor (QBD) data structures are disclosed in related application Docket Number RA-3317 on pp. 38–42. The dequeued entry's Upper Limit (prior to expansion if the Expand On DEQ field is enabled in the Control Area of the Queue Header 102) is written to the Upper Limit field 124 of the Aa register 112. This is represented on FIG. 1 by action Arrow 126. The Upper Limit field specifies the number of words of data in the Text Area of the Queue Entry. The Text Area is the data structure that holds the message data to be passed between processes. The Aa+1 register (not shown) is written with the Queue's initial Count (i.e., the count prior to the dequeue operation). If the Queue's initial Count is zero, then the Aa+1 register is written to zero to indicate that no entry was dequeued. The DEQ instruction does not dequeue events.

The Dequeue Or Wait (DEQW) instruction is used to dequeue an entry, dequeue an event, or deactivate the executing process to wait for an entry or event to be placed on the Queue. If the Queue's initial Count is non-zero, processing is as described above for the DEQ instruction. If the Queue's Count is zero (meaning no entries are on the Queue) and there is an event enqueued to the Queue, then the event is dequeued and the Aa+1 register is written to zero, and the event is cleared in the Queue. If the Queue's Count is zero and there is no event enqueued to the Queue, then the executing process is deactivated to wait for an entry or an event to be placed on the Queue by another process.

Figure 2:
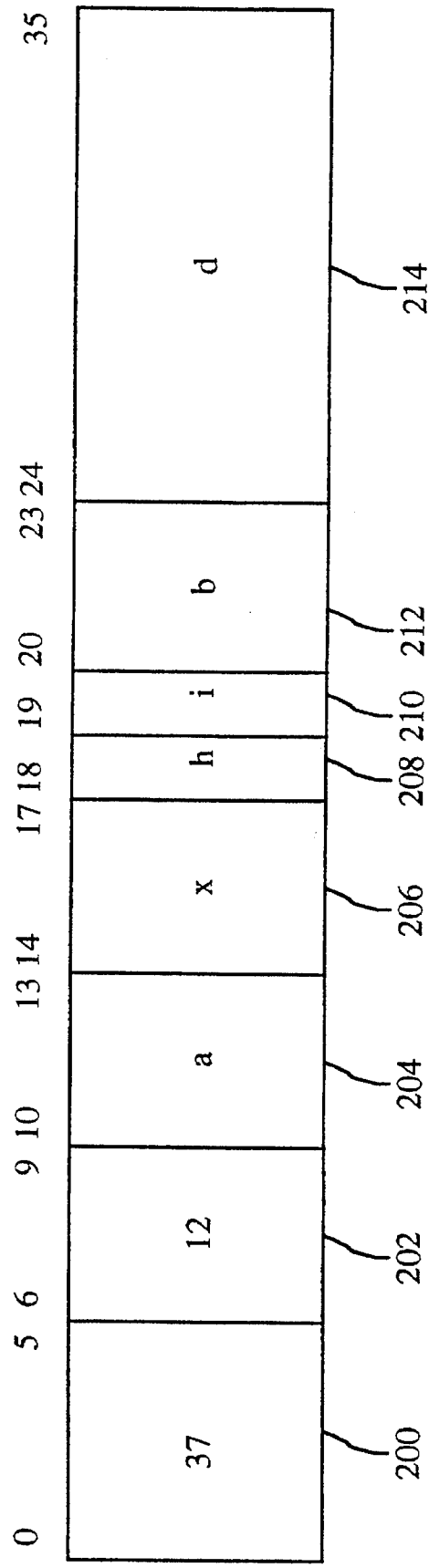
FIG. 2 is a diagram of the instruction format of the Dequeue instruction.

FIG. 2 is a diagram of the instruction format of the DEQ instruction. In the preferred embodiment, the DEQ instruction is designed to operate as part of the instruction set architecture of the 2200 Series computer system, commercially available from Unisys Corporation. All instructions in this system architecture consist of a 36-bit word in a format which identifies the function code and the registers and/or the storage words which are to be operated on by the processor. The particular format used depends on the execution mode and the type of instruction. There are two execution modes of instruction, Extended Mode and Basic Mode. The DEQ and DEQW instructions are Extended Mode instructions. The Function Code field 200, specifies the operation to be performed by the instruction. For the DEQ instruction, the value of the function code field is 37. The Extended Function Code field 202, acts as part of the Function Code for some instructions. For the DEQ instruction, the Extended Function Code is used and has a value of 12.

The Register Operand Address "a" field 204 specifies an Arithmetic Register for use as a register operand. The selected Aa register is used to access the L,BDI of the Queue Entry QBD, and the Upper Limit value of the Queue Entry. The Index Register "x" field 206, when non-zero, specifies an Index Register to be used in the indexing operation to form the Instruction Operand Address. The Index Incrementation Designator "h" bit 208 is used to increment the "X" register during the execution of the instruction. The Indirect Addressing Designator "i" bit 210 is used as an extension of the "b" field described below, or as a relative addressing flag. The Base Register Selector "b" field 212 specifies a Base Register which describes the Bank containing the instruction operand. The Displacement Address "d" field 214 contains a displacement value that is used in conjunction with the modifier portion of the Index Register specified by the "x" field 206 to form the Instruction Operand Address called "U". The Instruction Operand Address "U" is formed by adding (using 1's complement arithmetic) the unsigned value (zero-filled on the left) of the Displacement Address "d" field 214 to the signed modifier portion of the Index Register specified by the "x" field 206, and then adding this value to the base value from the "b" register (using 2' complement arithmetic). The contents of U are used to reference the L,BDI of the Queue Header QBD as described above. The definition of the Dequeue Or Wait (DEQW) instruction is the same as is shown in FIG. 2, except the value of the Extended Function Code 202 must be 13.

Figure 3:
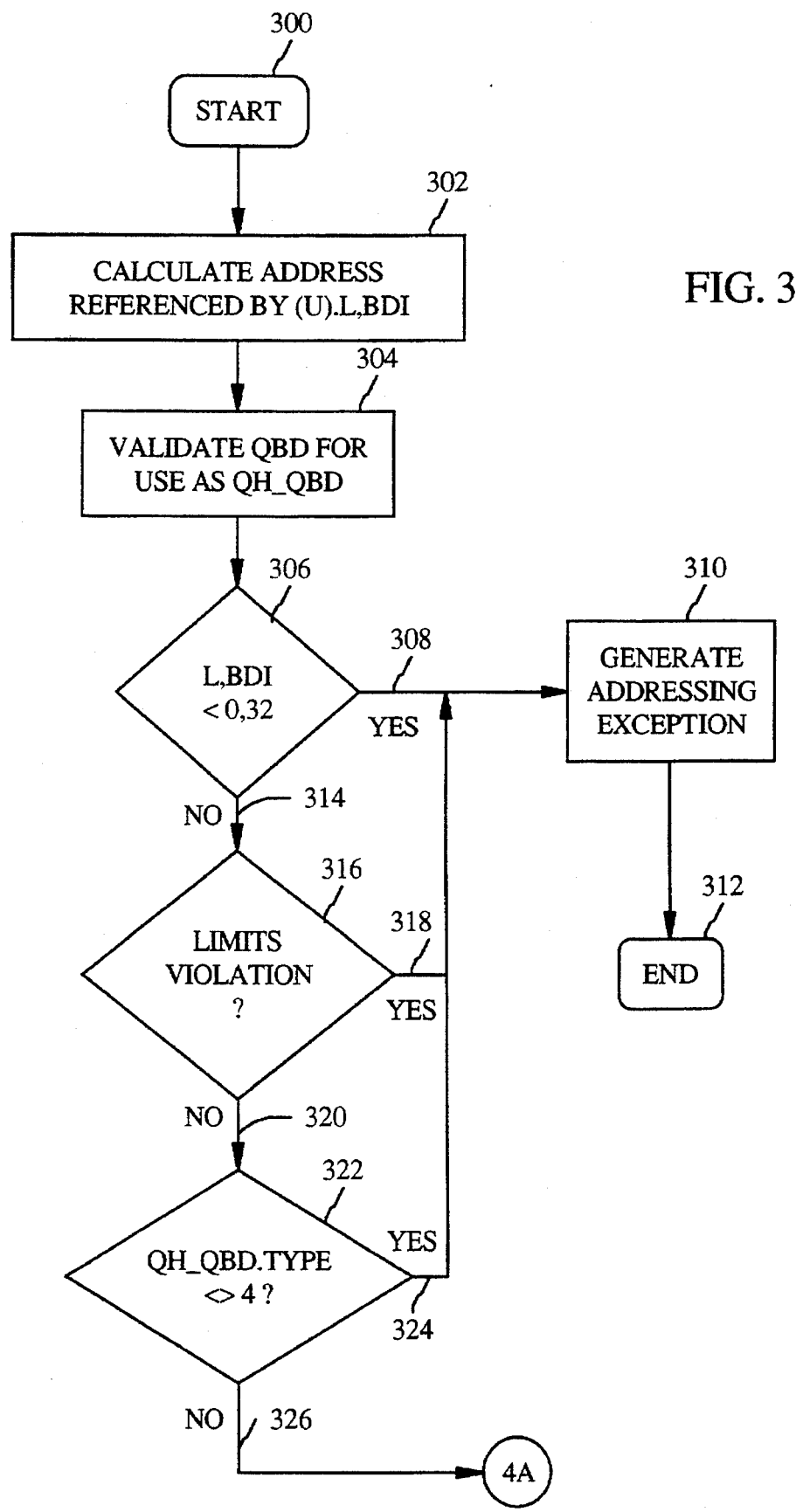
FIGS. 3, 4, 5, 6, 7, 8, and 9 are flow diagrams describing the processing steps for executing the DEQ/DEQW instructions.

FIG. 3–9 are flow diagrams describing the processing steps for executing the DEQ and DEQW instructions. Referring now to FIG. 3 and Start Step 301), the address of the QBD referenced by the value in the L,BDI field of (U) is calculated at Step 302. This QBD must be validated for use as a QBD for the Queue Header (QH) at Step 304. The validation process continues as follows. At Test Step 306, if L,BDI is less than 0,32, then an error has been detected and Yes path 308 is taken to Step 310. At this step, an addressing exception error is generated and processing of the DEQ/DEQW instruction ends at End Step 312. If no error is detected at Test Step 306, then No path 314 is taken to Test Step 316. At Test Step 316, if a limits violation is detected on the QBD reference, then Yes path 318 is taken to Step 310, where an addressing exception error is generated and processing ends at Step 312. If no error is detected at Test Step 316, then No path 320 is taken to Test Step 322. At Test Step 322, if the Type field in the Queue Header QBD specifying the type of bank descriptor is not equal to four, then an error has been detected and Yes path 324 is taken to Step 310, where the addressing exception is generated. If no error occurred, then No path 326 is taken to FIG. 4 via connector 4A.

Figure 4:
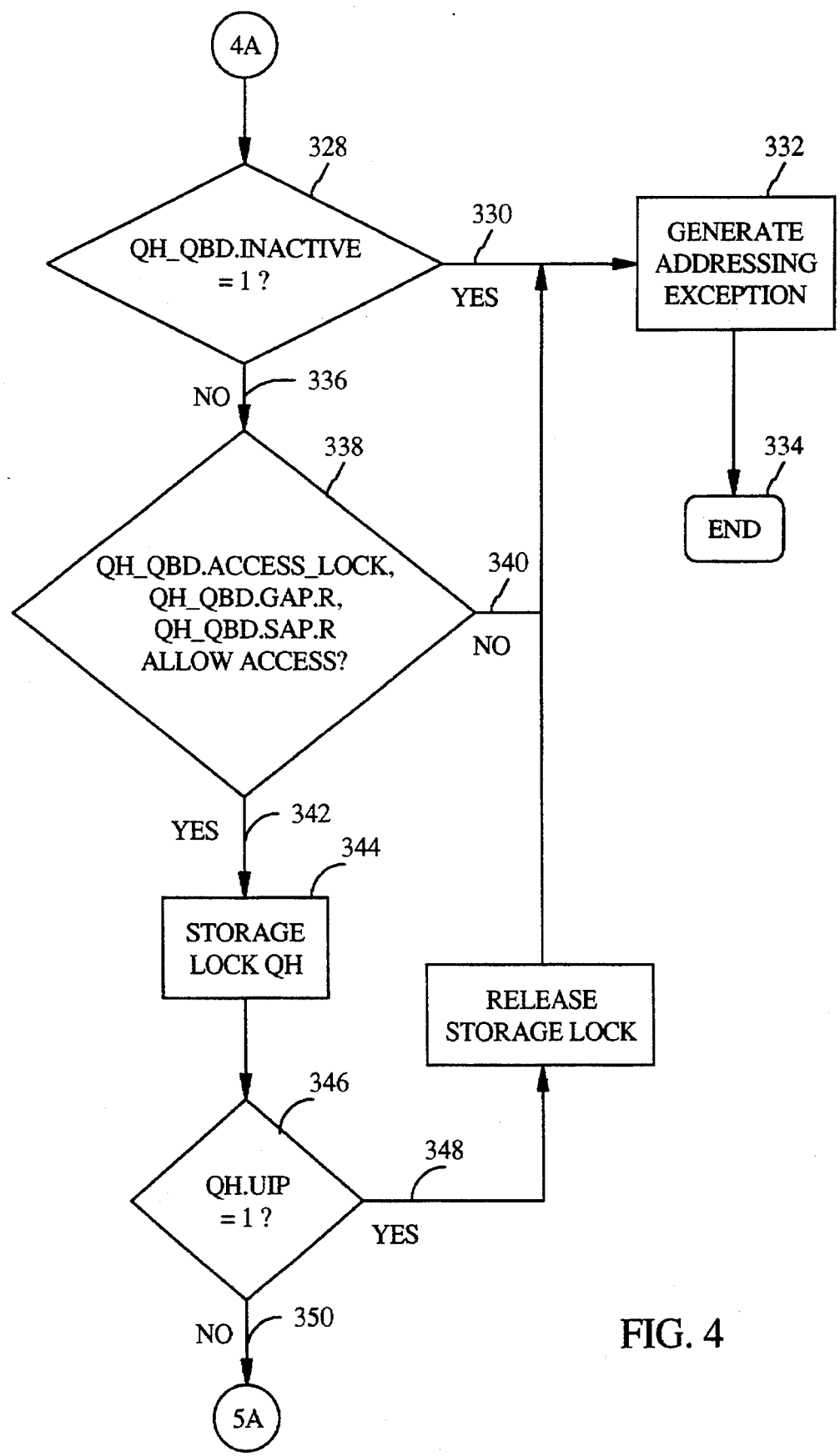

Referring to FIG. 4, at Test Step 328, a check is made to determine if the Queue Header QBD is inactive. If it is an inactive QBD, then an error is detected and Yes path 330 is taken to Step 332. At this step an addressing exception error is generated and processing ends at End Step 334. If the Queue Header QBD is active (i.e., it is being used to reference the Queue), then No path 336 is taken to Test Step 338. At Test Step 338, the security fields of the Queue Header QBD are validated. If the Queue Header QBD's Access_Lock, General Access Permission (GAP) Read, and Special Access Permission (SAP) Read bits are set to not allow dequeue access to the Queue, then an error is detected and No path 340 is taken to Step 332 for further error processing. If the security bits allow dequeue access to the Queue, then Yes path 342 is taken to Step 344. At Step 344, the Queue Header is storage locked to prevent access to the Queue by any other process active in the system. At Test Step 346, a check is made of the Update In Progress (UIP) bit in the Queue Header. If the UIP is already set to one (and the storage lock on the Queue Header was obtained), an error is detected. The Queue has possibly been corrupted by another process. Yes path 348 is taken to Step 332, where an addressing exception is generated and processing ends at End Step 334. If the UIP is not already set, then No path 350 is taken to FIG. 5 via connector 5A.

Figure 5:
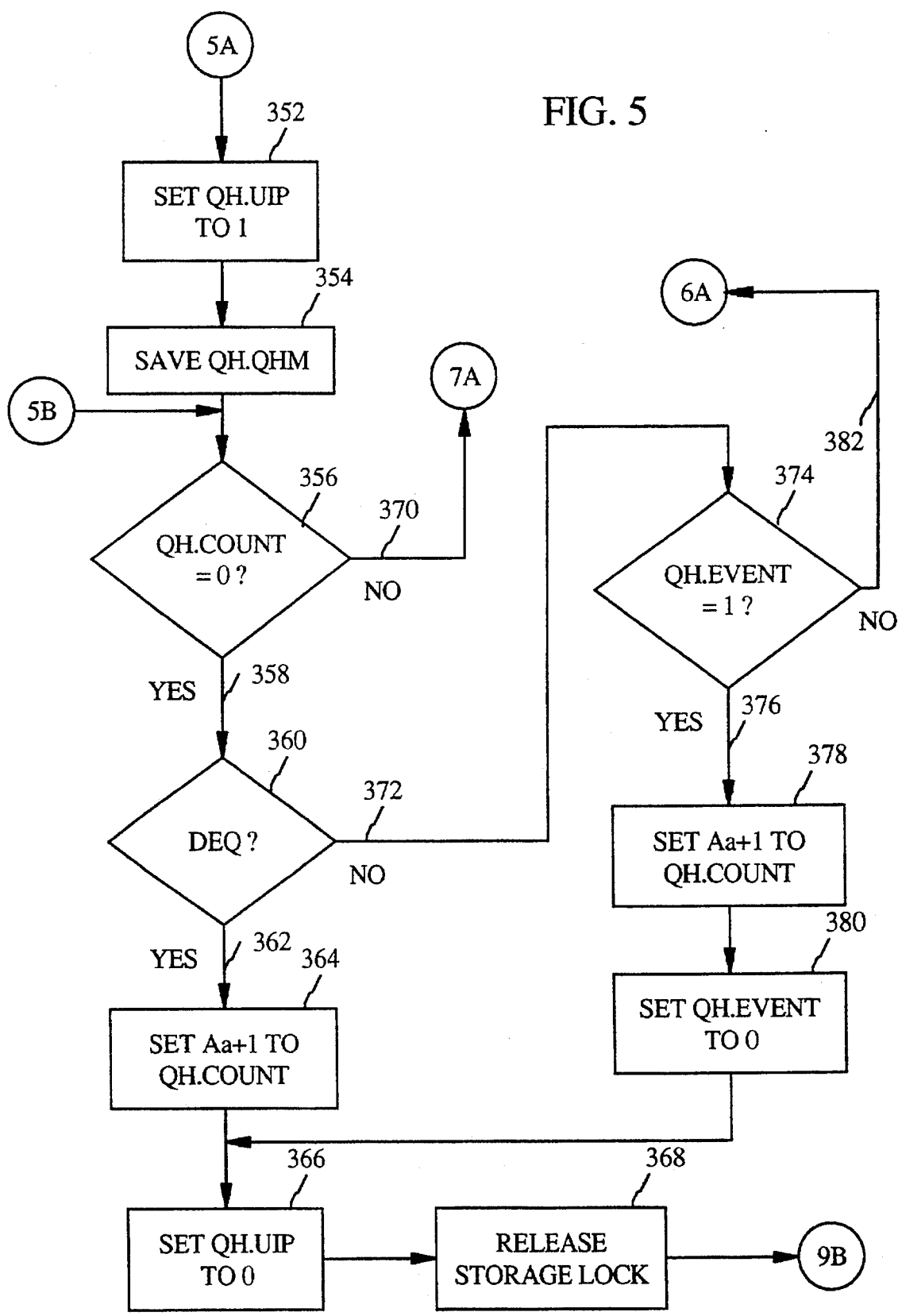

At Step 352 on FIG. 5, the UIP bit in the Queue Header is set to one. Next, at Step 354, the Queue Header Monitor (QHM) bit in the Queue Header and the contents of a process monitor state bit are saved for later use. At Test Step 356, if the Count in the Queue Header is zero, Yes path 358 is taken to Test Step 360. If the current instruction is a DEQ (Test Step 360). the requesting process is attempting to dequeue an entry from an empty queue. Thus, Yes path 362 is taken to Step 364. The Count (which is zero) is set to the Arithmetic Register specified by a+1. Next, the UIP bit is cleared at Step 366, the storage lock on the Queue header is release at Step 368, and processing continues on FIG. 9 via connector 9B. If at Test Step 356 the Count was not zero (that is, there is at least one entry on the queue), then No path 370 is taken to FIG. 7 via connector 7A. If the Count is zero but the current instruction is a Dequeue Or Wait (DEQW) instruction, then No path 372 is taken from Test Step 360. If the Count is zero and the current instruction is a DEQW, event processing may need to be performed. If the Event bit in the Queue Header is one (Test Step 374), then there is an event indicator presently on the Queue. Yes path 376 is then taken to Step 378, where the Count is returned in the Arithmetic Register selected by a+1. At Step 380, the Event bit in the Queue Header is cleared and processing continues with Step 366. If there is no event on the Queue (as indicated by the Event bit in the Queue Header), the server process must be added to the Wait List. Therefore, No path 382 is taken to FIG. 6 via connector 6A.

Figure 6:
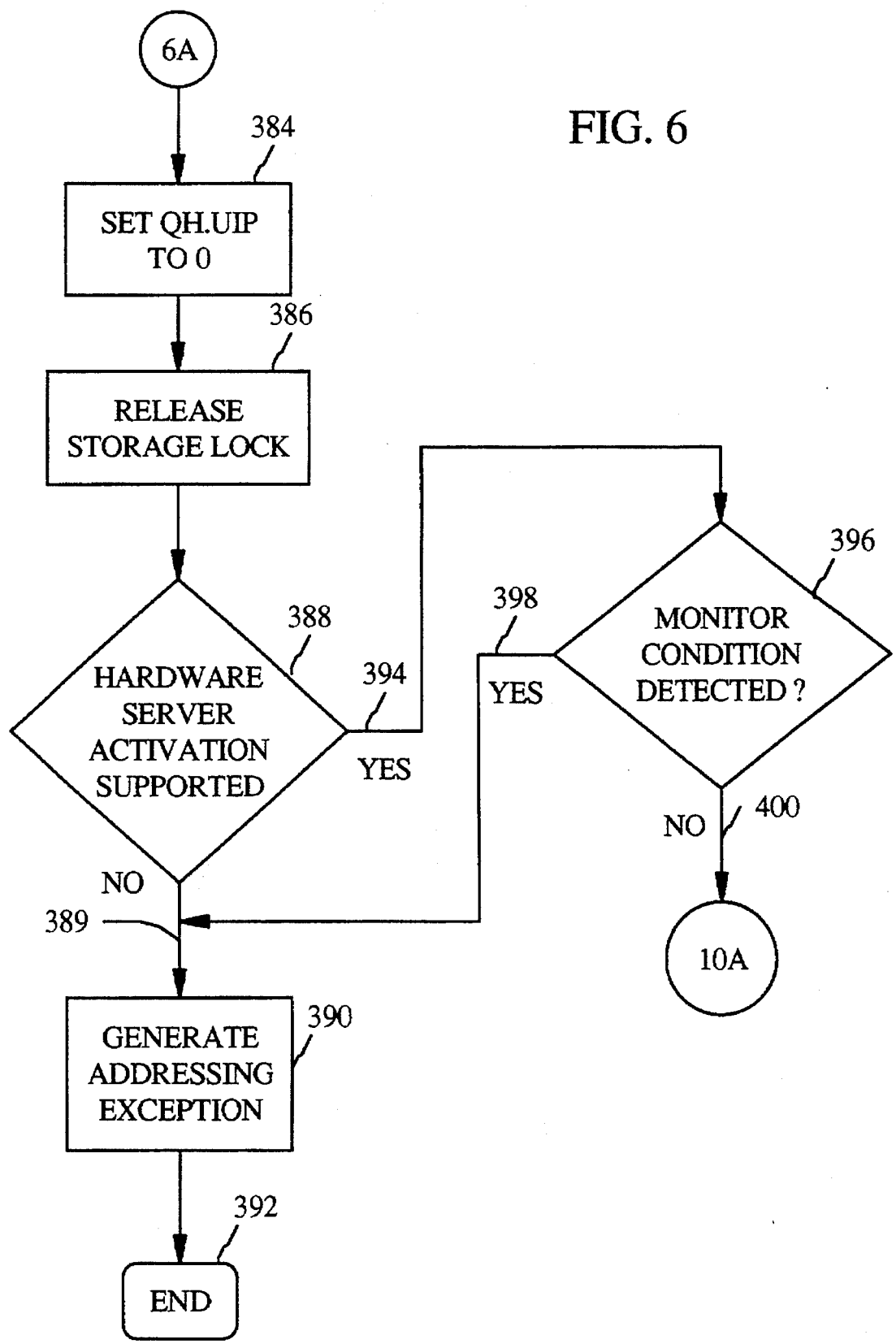

At Step 384 on FIG. 6, the Update In Progress (UIP) bit is set to zero, and the storage lock on the Queue Header is released at Step 386. At Test Step 388, if hardware server activation is not supported, then No path 389 is taken to Step 390. At this step an addressing exception is generated and processing ends at End Step 392. If hardware server activation is supported in this system, then Yes path 394 is taken to Test Step 396. If a queue monitor condition is detected (by testing the Queue Header Monitor bit in the Queue Header and the DB() value saved in Step 354), then Yes path 398 is taken to Step 390, where further error processing takes place. If no monitor condition is detected, then No path 400 is taken to FIG. 10 via connector 10A. At FIG. 10, the processing steps of the Wait On Queue algorithm are executed to remove a server process from the processor and add it to the Wait List. These steps are discussed below.

Figure 7:
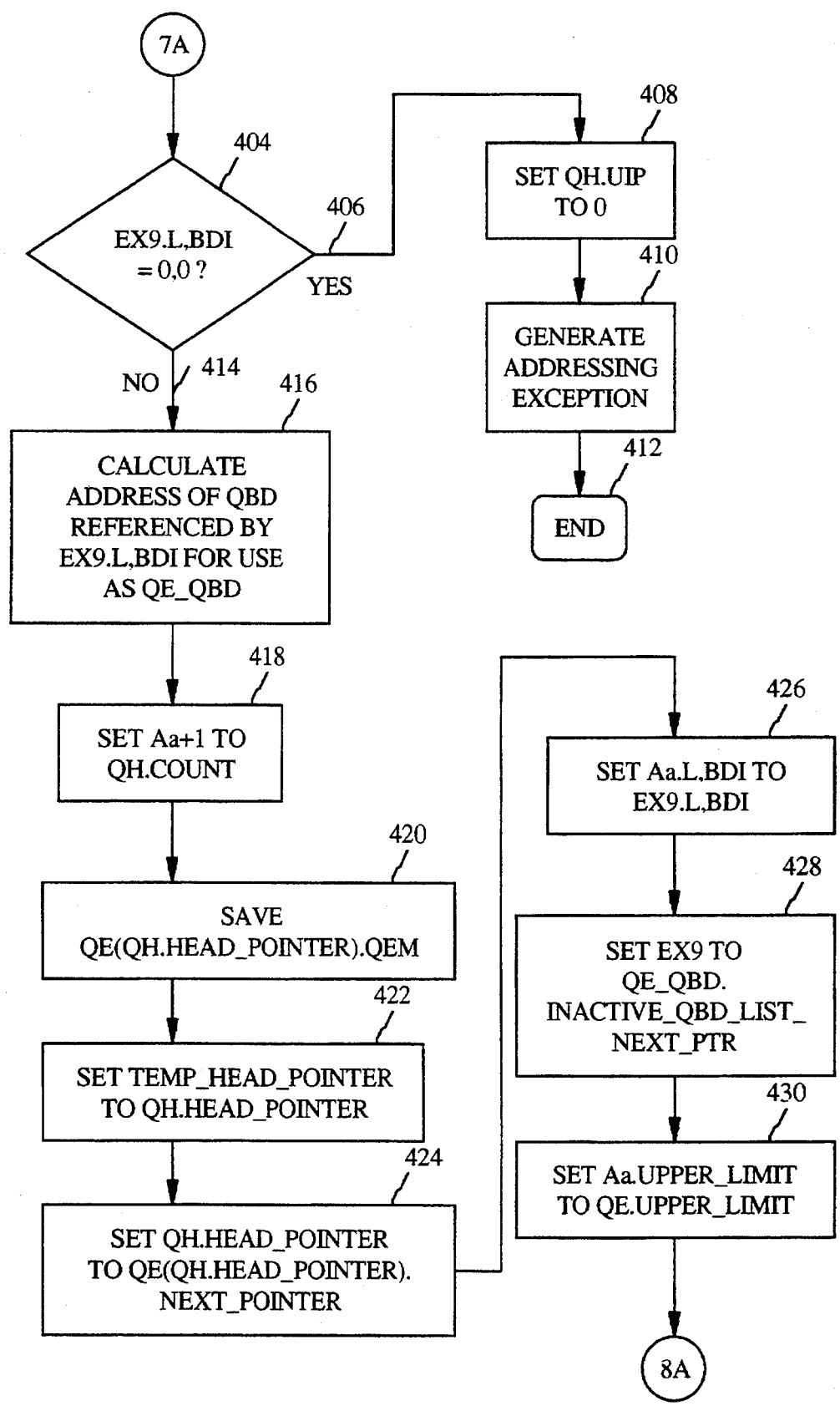

The steps to dequeue an entry begin on FIG. 7. At Test Step 404, if the L,BDI value in Executive Register 9 (EX9) is equal to 0,0, then the Inactive QBD List is empty. Thus, Yes path 406 is taken to Step 408, where the UIP bit is cleared. An addressing exception is generated (Step 410) and processing ends at End Step 412. If the L,BDI value of the Executive Register 9 is not equal to 0,0, No path 414 is taken to Step 416, where the address of the Queue Bank Descriptor (QBD) referenced by EX9.L,BDI is calculated for use as the QBD of the Queue Entry to be dequeued. At Step 418, the Arithmetic Register specified by a+1 is set to the Count field of the Queue Header. The Queue Entry Monitor (QEM) value in the Queue Entry pointed to by the Head Pointer field of the Queue Header is saved for future processing at Step 420. Next, the links in the Queue are modified by saving the current Head Pointer, then modifying the Head Pointer to point to the next entry on the Queue. At Step 422, a Temporary Head Pointer is set to the Head Pointer of the Queue Header. At Step 424, the Head Pointer of the Queue Header is set to the Next Pointer of the Queue Entry pointed to by the Head Pointer of the Queue Header.

The Queue Entry QBD is removed from the Inactive QBD List by setting the L,BDI field in the Arithmetic Register "a" to the L,BDI field of Executive Register 9 at Step 426 and by setting Executive Register 9 to the Inactive QBD List Next Pointer in the Queue Entry QBD at Step 428. The Upper Limit of Arithmetic Register "a" is then set to the Upper Limit field of the Queue Entry. Processing for dequeuing the queue entry continues on FIG. 8 via connector 8A.

Figure 8:
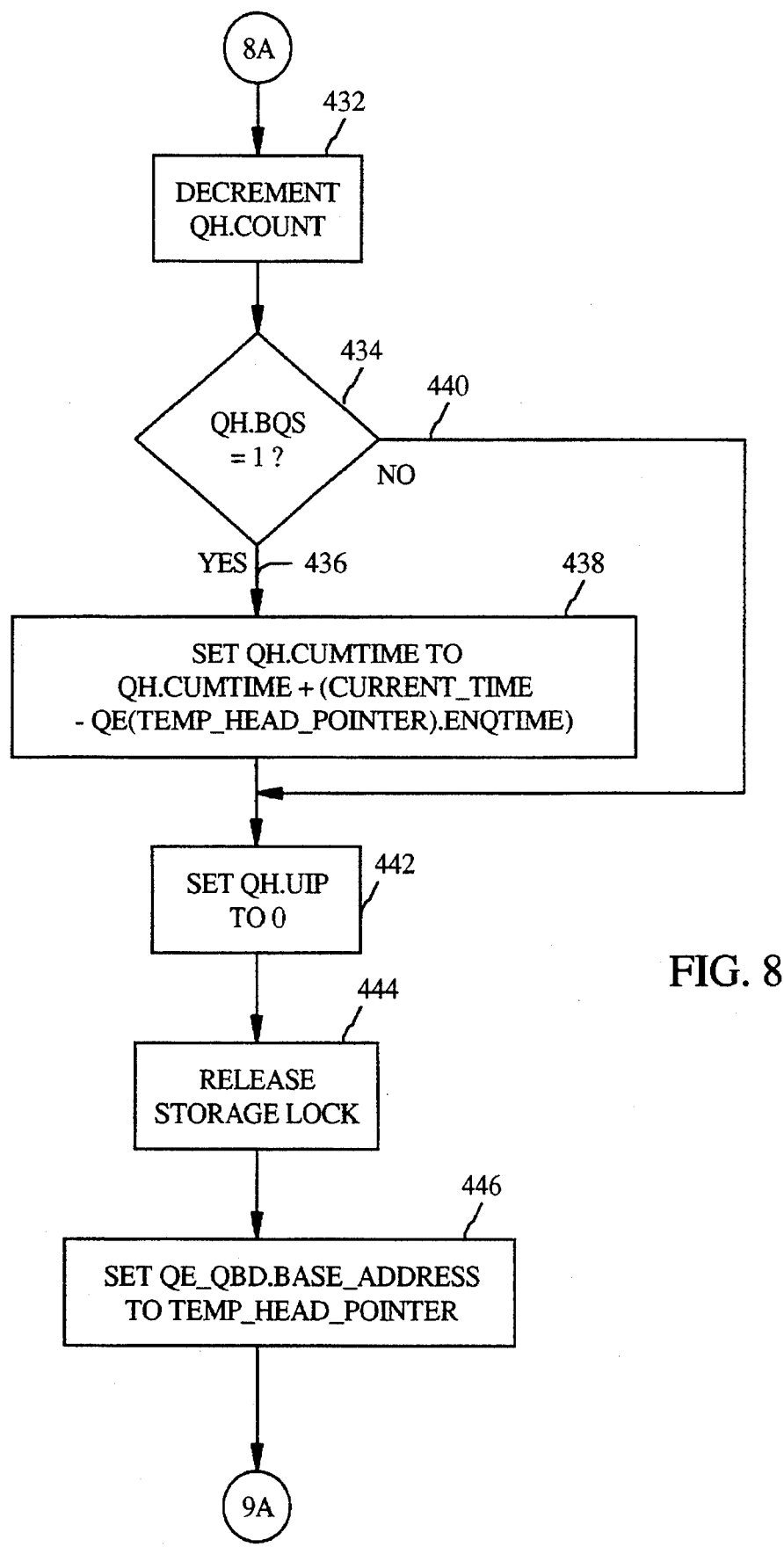
Figure 9:
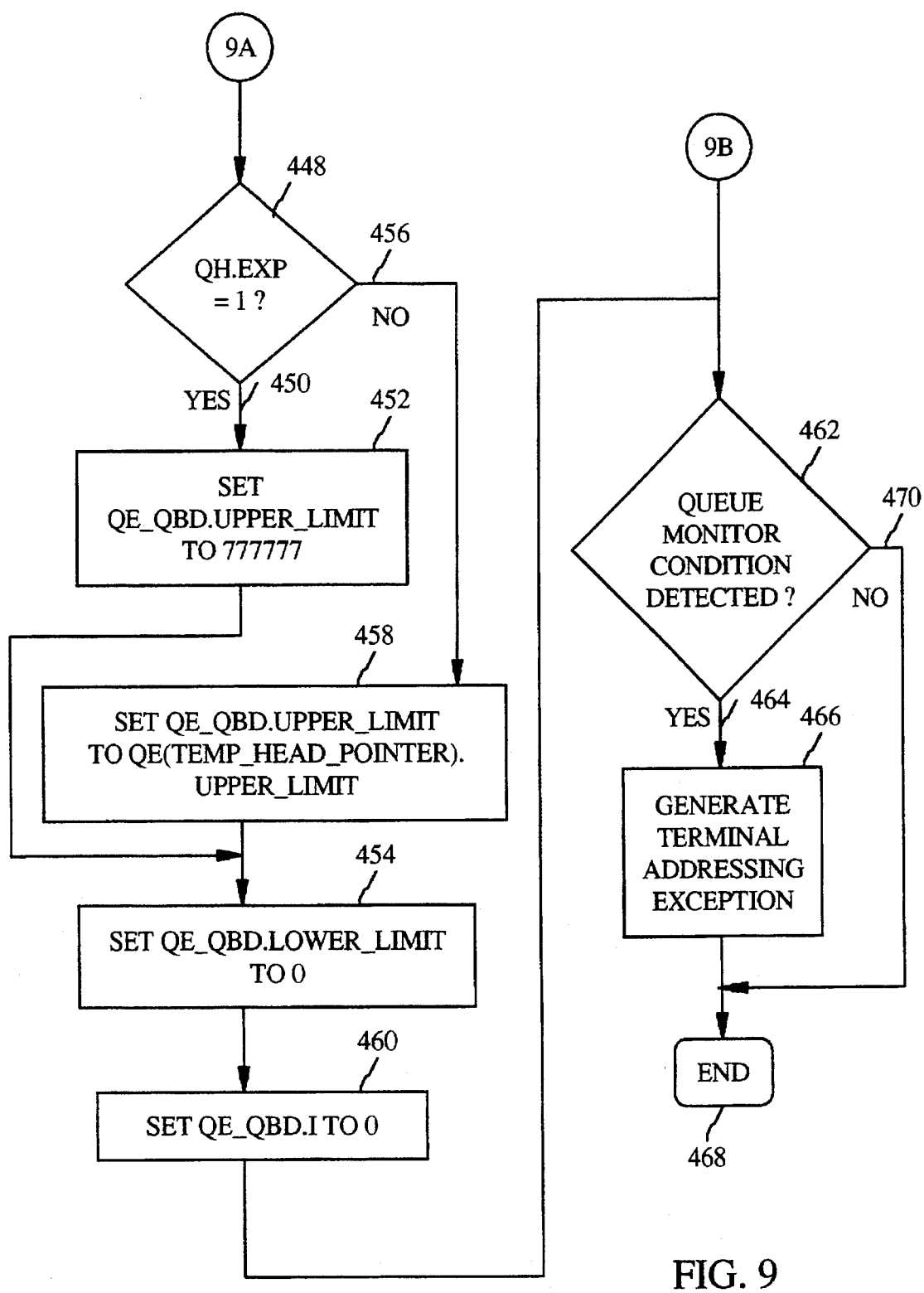

At Step 432 on FIG. 8, the Count of the Queue Header is decremented to reflect the removal of the queue entry from the Queue. If at Test Step 434, Basic Queue Statistics (BQS) is enabled for the Queue (i.e., the BQS bit in the Queue Header is one), then Yes path 436 is taken to Step 438. At this step the Cumulative Time (CUMTIME) in the Queue Header is updated by adding the current CUMTIME to the current time from the system dayclock minus the enqueue time (ENQTIME) of the Queue Entry pointed to by the Temporary Head Pointer (that is, the queue entry being dequeued). Thus, the time spent on the Queue by the Queue Entry being dequeued is removed from the CUMTIME statistic. If BQS is disabled for the Queue, the No path 440 is taken to Step 442. The UIP bit is cleared at Step 442. At Step 444, the storage lock on the Queue Header is released.

The Queue Bank Descriptor (QBD) of the Queue Entry is then updated in the following manner. At Step 446, the Base Address field in the QBD is set to the value in the Temporary Head Pointer. Thus, the Base Address points to the newly dequeued Queue Entry. At Test Step 448 on FIG. 9, if the Expand (EXP) bit of the Queue Header is set to one, then Yes path 450 is taken to Step 452, where the Upper Limit of the Queue Entry QBD is set to 777777 octal (the maximum bank size). Processing continues at Step 454. If the EXP bit is not set, No path 456 is taken to Step 458, where the Upper Limit of the Queue Entry QBD is set to the Upper Limit of the newly dequeued Queue Entry, which is referenced by the Temporary Head Pointer. At Step 454, the Lower Limit field of the Queue Entry QBD is set to 0, and at Step 460 the Inactive bit in the QBD is set to 0.

At Test Step 462, if a queue monitor condition is detected, then Yes path 464 is taken to Step 466, where a terminal addressing exception is generated. Processing of the DEQ/DEQW instruction then ends at End Step 468. If a queue monitor condition is not detected at Test Step 462, then No path 470 is taken to End Step 468.

Figure 10:
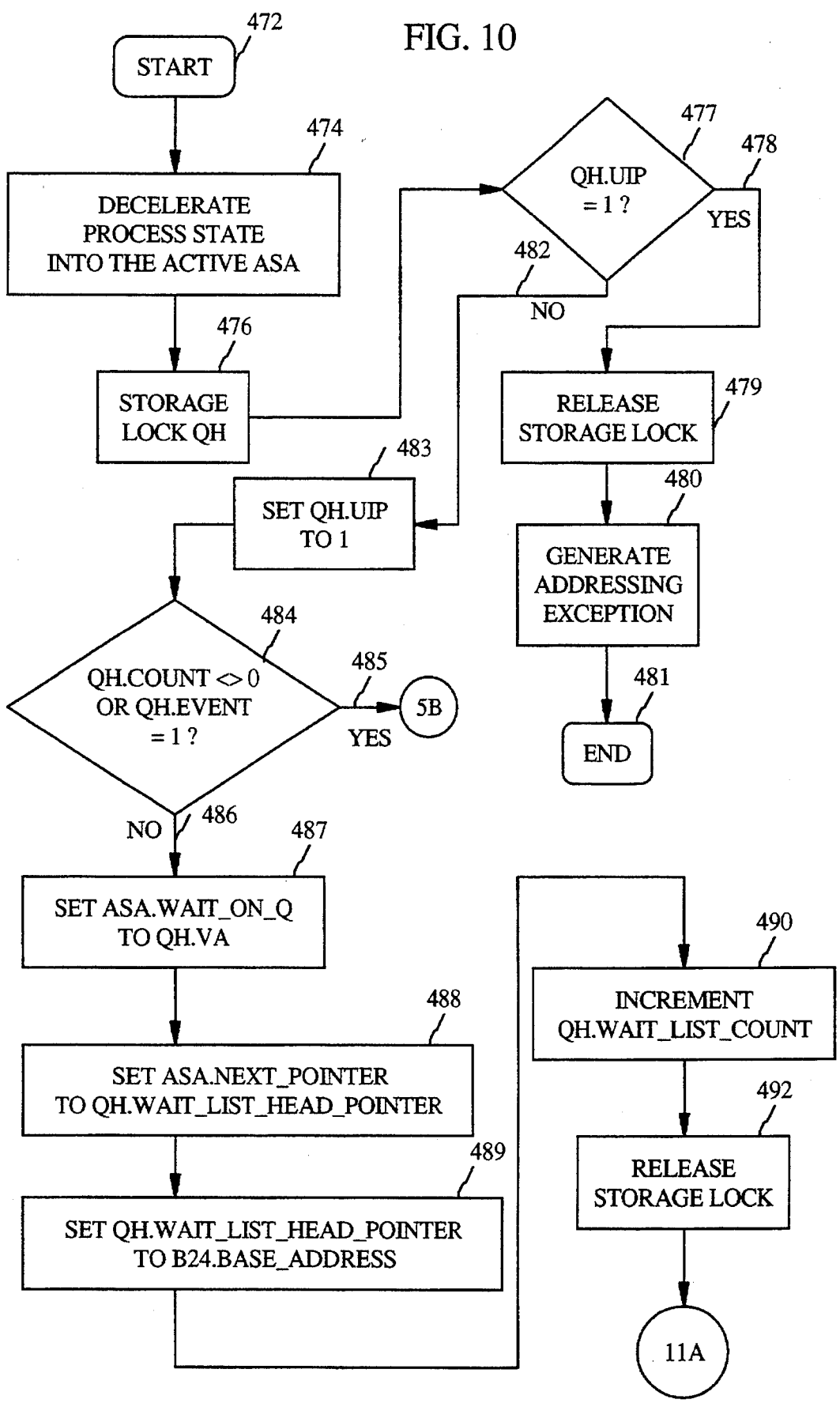
FIG. 10 is a flow diagram describing the processing steps for executing the Wait On Queue algorithm.

FIG. 10 is a flow diagram describing the processing steps for executing the Wait On Queue algorithm. The Wait On Queue algorithm (called in Step 402 of FIG. 6) removes a server process from the processor and adds it to a Queue's wait List. The Queue Header is unlocked during state deceleration to avoid locking out access to the Queue during this operation. After Start Step 472, the process state of the active Activity Save Area (ASA) is decelerated at Step 474. Next, the Queue Header is storage locked at Step 476. At Test Step 477, if the UIP bit of the Queue Header (QH) is set to one, then Yes path 478 is taken to Step 479. Here, the storage lock is released. An addressing exception is then generated at Step 480 and processing ends at End Step 481. If the UIP bit of the Queue Header is not set, then No path 482 is taken and processing continues at Test Step 483. The UIP bit of the Queue Header is now set to one. At Test Step 484, if there are queue entries on the Queue (because the Count field of the Queue Header is not equal to zero) or there is an event indicator active for this Queue (because the Event field of the Queue Header is set to one), then Yes path 484 is taken back to Test Step 356 on FIG. 5 via connector 5B. Otherwise, No path 486 is taken to Step 487, where the Waiting On Queue field of the ASA for the server process being deactivated is set to the Virtual Address (VA) of the Queue Header. The Wait List Head Pointer of the Queue Header is set to the Base Address of Register B24 at Step 489. At Step 490, the Wait List Count for the Queue Header is incremented to reflect the addition of this server process to the Wait List. The storage lock is released at Step 492. Processing on FIG. 11 via connector 11A continues with the processing steps for the Dequeue from Switching Queue (DEQSWQ) algorithm. The DEQSWQ steps are executed to remove a process from a Switching Queue and accelerate it into the processor.

Figure 11:
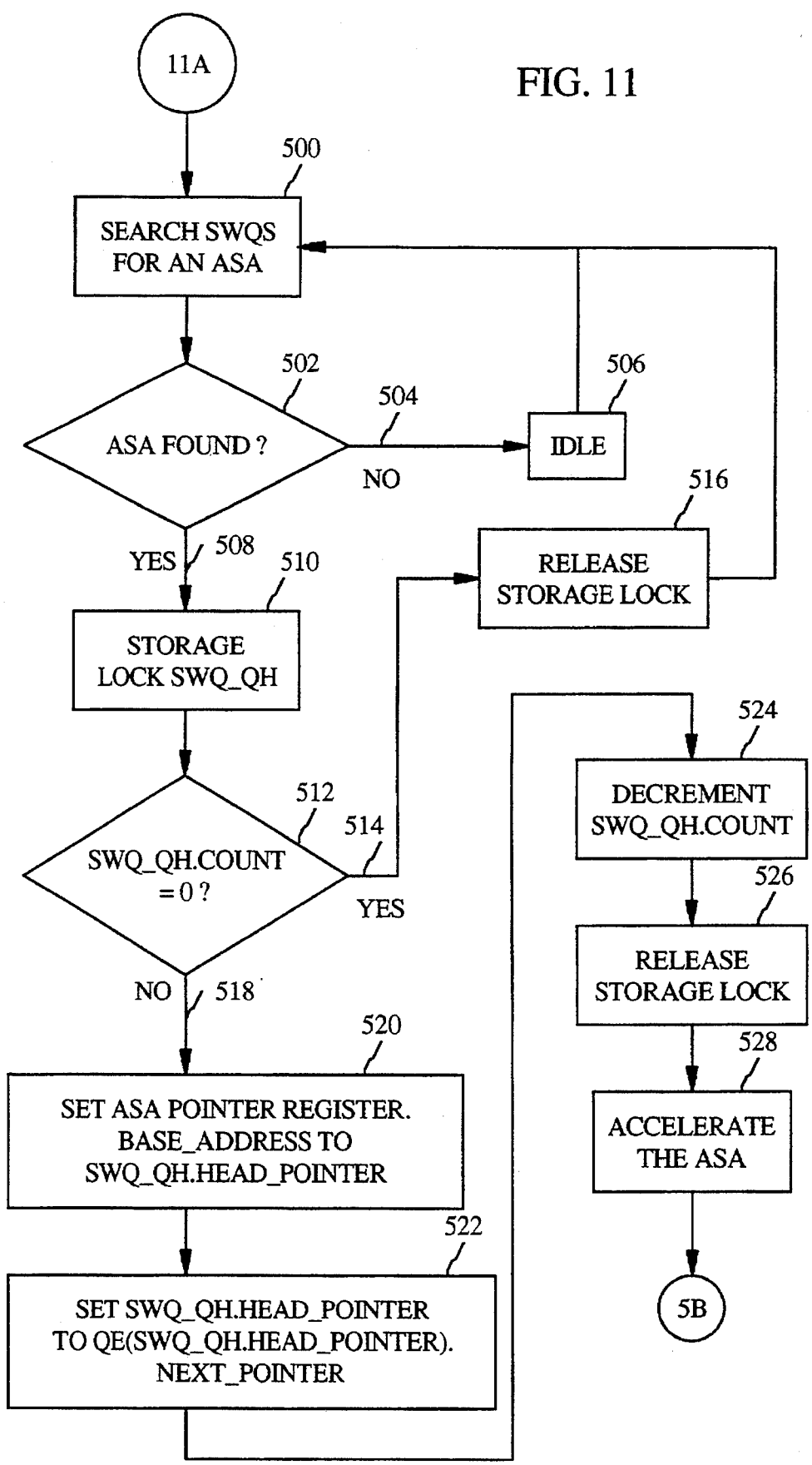
FIG. 11 is a flow diagram describing the processing steps for executing the Dequeue from Switching Queue algorithm.

FIG. 11 is a flow diagram describing the processing steps for executing the Dequeue from Switching Queue algorithm. Switching Queues are searched at Step 500 for an Activity Save Area (ASA). Switching Queues hold the processing state information for a process that is ready to be executed by the processor. If no ASA is found at Test Step 502, No path 504 is taken to Idle Step 506. Search processing is then repeated at Step 500. If an ASA is found (a process is ready to execute), then Yes path 508 is taken to Step 510, where the Queue Header of the Switching Queue is storage locked. If, at Test Step 512, the Count in the Queue Header of the Switching Queue is zero (meaning there are no entries on the Switching Queue), Yes path 514 is taken to Step 516, where the storage lock is released. A search for an ASA then begins again at Step 500.

If the Count in the Switching Queue is not zero, No path 518 is taken to Step 520. At this step, an ASA Pointer Register is set to the Head Pointer of the Queue Header of the Switching Queue. At Step 522, the Head Pointer of the Queue Header of the Switching Queue is set to the Next Pointer field of the queue entry referenced by the Switching Queue Head Pointer, thereby de-linking the queue entry from the Switching Queue. The Count in the Queue Header of the Switching Queue is decremented to reflect the deletion of the entry at Step 524. At Step 526, the storage lock on the Queue Header is released, and the ASA is accelerated into the processor (using the Base Address of the Register B24) at Step 528. Processing of the DEQSWQ algorithm ends and further processing continues on FIG. 5 via connector 5B.

Examples of using the Dequeue (DEQ) and Dequeue Or Wait (DEQW) instructions as part of a high-level language implementation are shown below.

A. Dequeue

Instruction Format: DEQ a,*d,*x,b

Input: Queue Header

Output: Queue Entry, Queue Entry Upper Limit, Initial Count

C function: queue_entry dequeue(queue_header header_pointer, int*initial_count, int*upper_limit):

Note: The initial_count will be zero anti the queue_entry pointer will be null if the queue was empty.

C Library Routine:

® 1994 Unisys Corporation
dequeue*

| | | |
|---|---|---|
| LBU | B9,A1 | Base parameter list |
| SSL | A0,36 | Set the function return to null |
| DEQ | A0,1,,B9 | Dequeue the queue entry |
| LBU | B2,7,,B9 | Base the upper limit |
| L | X2,8,,B9 | Load offset to upper limit |
| SZ | *0,X2,B2 | Clear upper limit |
| S,H2 | A0,*,X2,B2 | Store upper limit |
| LXM,U | A0,0 | Remove upper limit |
| LBU | B2,4,,B9 | Base the initial count |
| L | X2,5,,B9 | Load offset to initial count |
| S | A1,*0,X2,B2 | Store the initial count |
| L,U | A1,0 | Set function return offset to zero |
| RTN | | Return |

B. Dequeue Or Wait

Instruction Format: DEQW a,*d,*x,b

Input: Queue Header

Output: Queue Entry, Queue Entry Upper Limit, Initial Count

C function: queue_entry dequeue_or_wait(queue_header header_pointer, int*initial_count, int*upper_limit);

Note: The initial_count will be zero anti the queue_entry pointer will be null if there is an event to handle.

C Library Routine:

® 1994 Unisys Corporation
dequeue*

| | | |
|---|---|---|
| LBU | B9,A1 | Base parameter list |
| SSL | A0,36 | Set the function return to null |
| DEQW | A0,1,,B9 | Dequeue the queue entry |
| LBU | B2,7,,B9 | Base the upper limit |
| L | X2,8,,B9 | Load offset to upper limit |
| SZ | *0,X2,B2 | Clear upper limit |
| S,H2 | A0,*,X2,B2 | Store upper limit |
| LXM,U | A0,0 | Remove upper limit |
| LBU | B2,4,,B9 | Base the initial count |
| L | X2,5,,B9 | Load offset to initial count |
| S | A1,*0,X2,B2 | Store the initial count |
| L,U | A1,0 | Set function return offset to zero |
| RTN | | Return |

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

We claim:

1. In a computer system executing a plurality of processes controlled by a computer operating system, the computer system having at least one processor for executing instructions and a main storage unit accessible by the plurality of processes, units of data storage residing in the main storage unit called queue banks, each queue bank being capable of representing a queue header element or a queue entry element of a queue, each queue including a linked list of one queue header and zero or more queue entries, a queue entry being used for storing a group of data signals to be communicated between processes, the queue header being used to store queue control information including queue links and an event indicator, a system supporting interprocess communication by executing a dequeue instruction said dequeue instruction being part of the instruction set architecture of the computer system, comprising:

queue access means for accessing a queue selected by the dequeue instruction;

queue entry access means for accessing a queue entry to be dequeued from said selected queue; and queue updating means for updating the queue links connecting the queue header and the queue entries of said selected queue to remove said queue entry from said selected queue, thereby providing access to the group of data signals in said queue entry for the process requesting the execution of the dequeue instruction.

2. The system of claim 1, further including means for suspending the process requesting execution of the dequeue instruction if said selected queue has no queue entries or if the event indicator in the queue header of said selected queue indicates that no event has occurred.

3. A computer system for executing a plurality of processes controlled by a computer operating system and having at least one processor for executing instructions and a main storage unit accessible by the plurality of processes comprising:

a plurality of queue banks residing in the main storage unit, each of said queue banks representing a queue header or a queue entry of a queue, each queue being a linked list of one queue header and zero or more queue entries, each said queue header including an event indicator;

instruction processing means included in the processor for executing a dequeue instruction to remove a queue entry from the front of a selected queue, said selected queue being selected by the operands of said dequeue instruction, said instruction processing means including:

queue access means for accessing said selected queue;

queue entry access means for accessing said queue entry; and queue updating means for updating said selected queue and said queue entry to remove said queue entry from said selected queue.

4. The system of claim 3, further including means for suspending the process requesting execution of said dequeue instruction if said selected queue has no queue entries or if said event indicator in said queue header of said selected queue indicates that no event has occurred.

5. In a computer system having at least one processor for executing instructions and a main storage unit having units of data storage called queue banks, each queue bank being capable of representing a queue header element or a queue entry element of a queue, each queue bank containing a control area for holding control information, and a text area for holding message data words, a queue being a linked list of one queue header and zero or more queue entries, the links of the queue being stored in the control area of the queue banks representing the queue header and queue entries, a queue bank being accessed via a queue bank descriptor data structure, queue bank descriptors not currently in use being saved in an inactive queue bank descriptor list, and a queue being accessed via the queue bank descriptor of its queue header, a queue header being used to store queue control information including queue links and an event indicator, a system for executing a dequeue instruction to receive and obtain access to message data words communicated from a sending process to a receiving process, comprising:

address calculation means for calculating the address of the queue bank descriptor of the queue header of a queue selected by the operands of the alequeue instruction;

queue access means for accessing the queue header and queue entries of said selected queue by referencing the queue bank descriptor of the queue header of said selected queue;

means for suspending the process requesting execution of the dequeue instruction if said selected queue has no queue entries or if the event indicator in the queue header of said selected queue indicates that no event has occurred;

means for obtaining a new queue bank descriptor for a queue entry to be dequeued from the front of said queue from the inactive queue bank descriptor list;

queue updating means for updating the queue links in the control area of the queue header of said selected queue to point to the second queue entry in said selected queue, thereby removing said queue entry from said selected queue; and mapping means for mapping said queue entry to said new queue bank descriptor, thereby providing visibility to the contents of said queue entry.

6. In a computer system having at least one processor for executing instructions and units of data storage called queue banks, each queue bank being capable of representing a queue header element or a queue entry element of a queue, each queue bank containing a control area for holding control information and an event indicator and a text area for holding message data words, a queue being a linked list of one queue header and zero or more queue entries, the links of the queue being stored in the control area of the queue banks representing the queue header and queue entries, a method of executing a single instruction by the processor for the reception of message data words by a receiving process from a sending process, comprising the steps of:

(a) calculating the address of the queue header of a queue selected by the operands of the instruction, said queue being shared by the sending process and the receiving process; and (b) updating the links in the control area of the queue header of said selected queue to remove said queue entry from the front of said selected queue, thereby providing visibility to the message data words in said queue entry for the receiving process.

7. In a computer system having at least one processor for executing instructions and units of data storage called queue banks, each queue bank being capable of representing a queue header element or a queue entry element of a queue, each queue bank containing a control area for holding control information and an event indicator, and a text area for holding message data words, a queue being a linked list of one queue header and zero or more queue entries, the links of the queue being stored in the control area of the queue banks representing the queue header and queue entries, a method of executing a single instruction by the processor to synchronize at least two processes, comprising the steps of:

(a) calculating the address of the queue header of a queue selected by the operands of the instruction;

(b) reading the event indicator in the control area of the queue header of said selected queue, to determine if an event related to said selected queue has occurred; and (c) activating a previously suspended process if the event indicator indicates that an event related to said selected queue has occurred and there are suspended processes in the system waiting for the event indicator being set for said selected queue.

8. In a computer system having at least one processor for executing instructions and units of data storage called queue banks, each queue bank being capable of representing a queue header element or a queue entry element of a queue, each queue bank containing a control area for holding control information, and a text area for holding message data words, a queue being a linked list of one queue header and zero or more queue entries, the links of the queue being stored in the control area of the queue banks representing the queue header and queue entries, a queue bank being accessed via a queue bank descriptor data structure, queue bank descriptors not currently in use being saved in an inactive queue bank descriptor list, and a queue being accessed via the queue bank descriptor of its queue header, a method of executing a single instruction by a processor for the reception by a receiving process of message data words from a sending process, comprising the steps of:

(a) calculating the address of the queue bank descriptor of the queue header of a queue selected by the operands of the instruction;

(b) accessing the queue header and queue entries of said selected queue by referencing the queue bank descriptor of the queue header of said selected queue;

(c) obtaining a new queue bank descriptor for a queue entry to be dequeued from the front of said selected queue;

(d) updating the queue links in the control area of the queue header to point to the second queue entry in said selected queue, thereby removing said queue entry from said selected queue: and (e) mapping said queue entry to said new queue bank descriptor, thereby providing visibility to the contents of said queue entry for the receiving process.

* * * * *